(12) United States Patent
Noritake et al.

(10) Patent No.: US 6,981,688 B2
(45) Date of Patent: Jan. 3, 2006

(54) FLOW CONTROL DEVICE

(75) Inventors: Seiichiro Noritake, Nagano (JP); Ryuhei Wada, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 49 days.

(21) Appl. No.: 10/782,384

(22) Filed: Feb. 19, 2004

(65) Prior Publication Data

US 2004/0200986 A1 Oct. 14, 2004

(30) Foreign Application Priority Data

Feb. 20, 2003 (JP) .............................. 2003-042060

(51) Int. Cl.
*F16K 31/04* (2006.01)
(52) U.S. Cl. ...................... 251/122; 251/208; 137/628; 137/630.14; 137/630.22
(58) Field of Classification Search ........... 137/630.17, 137/630.21, 630.22, 630.14, 628–630; 251/118, 251/120–122, 207–209; 141/128, 198; 222/71
See application file for complete search history.

(56) References Cited

U.S. PATENT DOCUMENTS

| | | | | |
|---|---|---|---|---|
| 2,763,407 A | * | 9/1956 | Rowell | 222/310 |
| 5,458,152 A | * | 10/1995 | Goehner et al. | 137/624.12 |
| 6,491,056 B2 | * | 12/2002 | Gibb | 137/271 |

* cited by examiner

*Primary Examiner*—J. Casimer Jacyna
(74) *Attorney, Agent, or Firm*—Hogan & Hartson, LLP

(57) ABSTRACT

A flow control device includes an opening part through which an upstream side of a fluid flow passage is in communication with a downstream side of the fluid flow passage. A valve element closes the opening part and includes a large flow rate controlling valve element capable of adjusting an opening degree of the opening part, a sealing member provided with a valve hole having an open area smaller than the opening part and formed to be capable of being brought into tight contact with a peripheral wall part of the opening part and a small flow rate controlling valve element capable of adjusting an opening degree of the valve hole. A valve drive device rotates to drive the valve element in a closed direction for closing the opening part or in an opened direction for opening the opening part.

17 Claims, 7 Drawing Sheets

[Fig. 1]
(A)
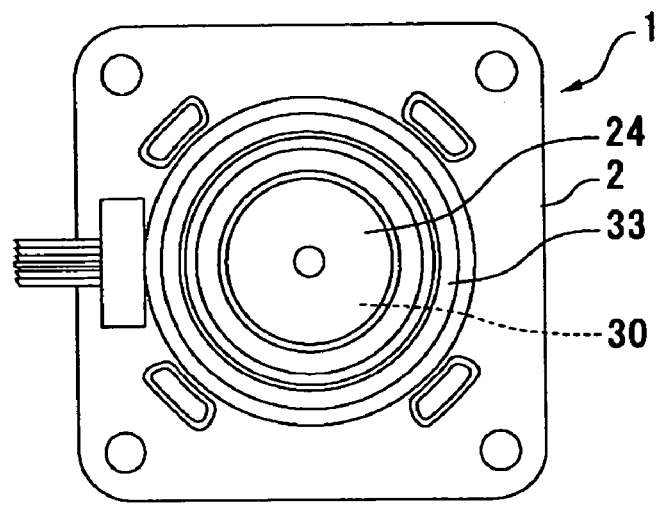
(B)
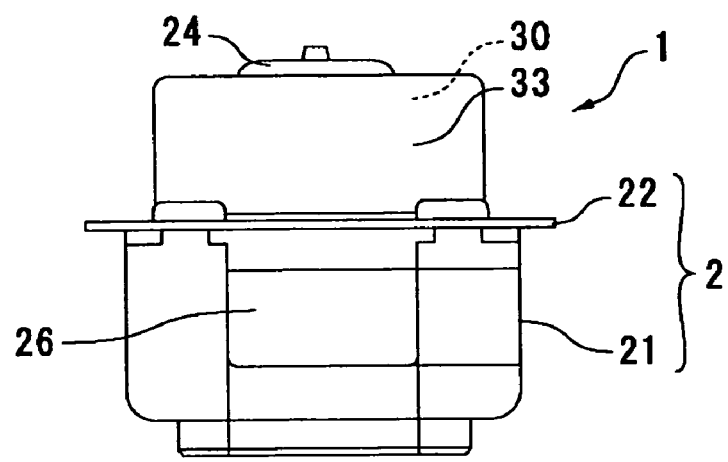
(C)
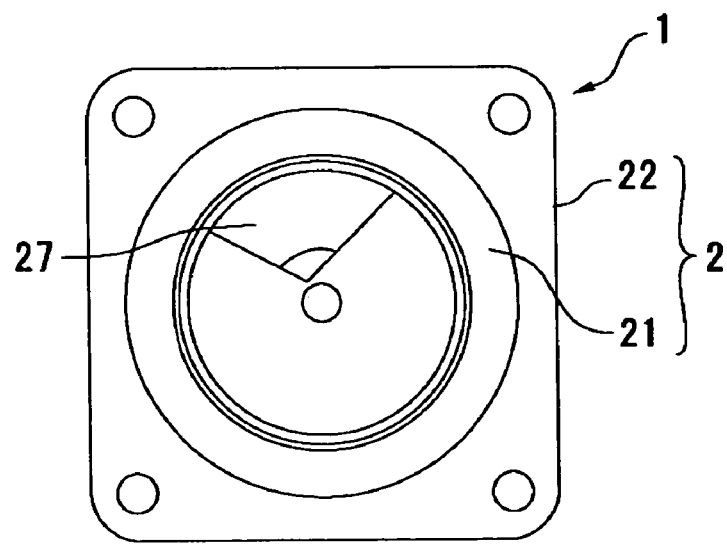

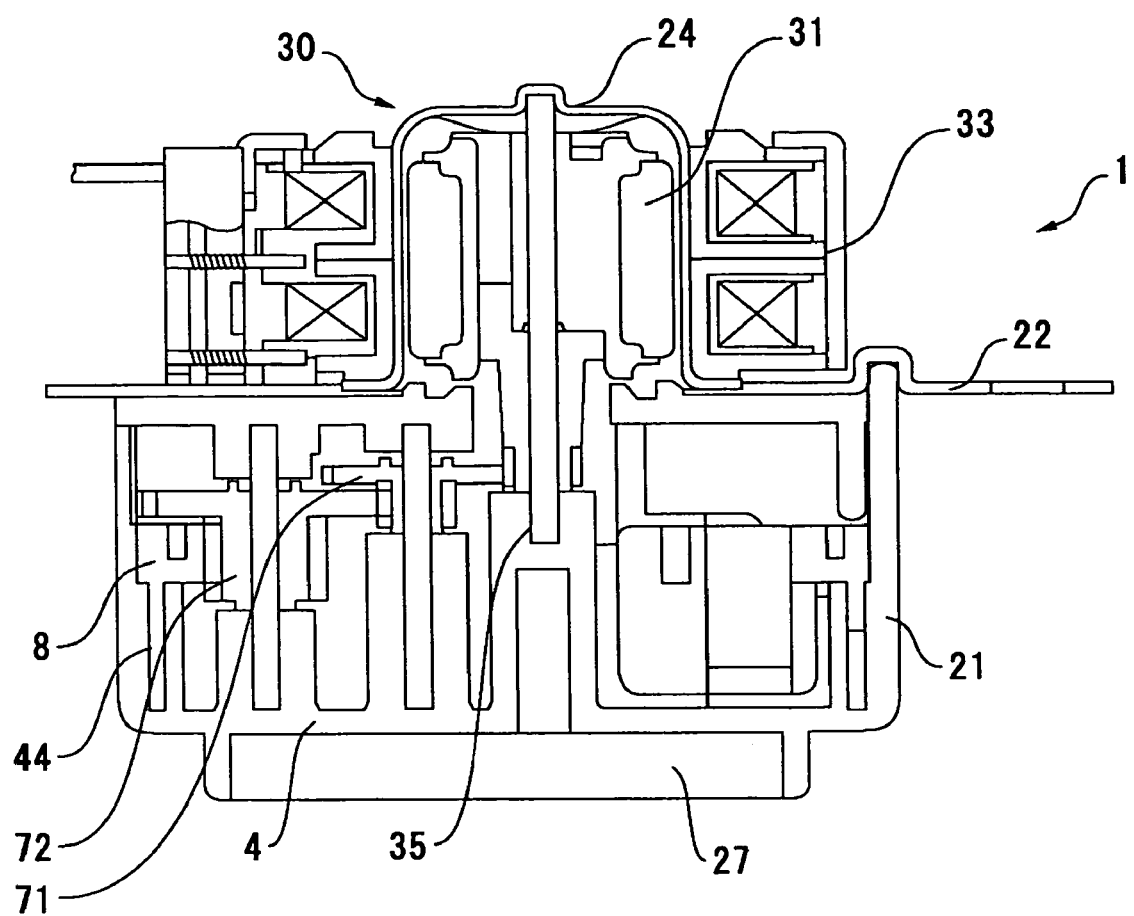
[Fig. 2]

[Fig.3]
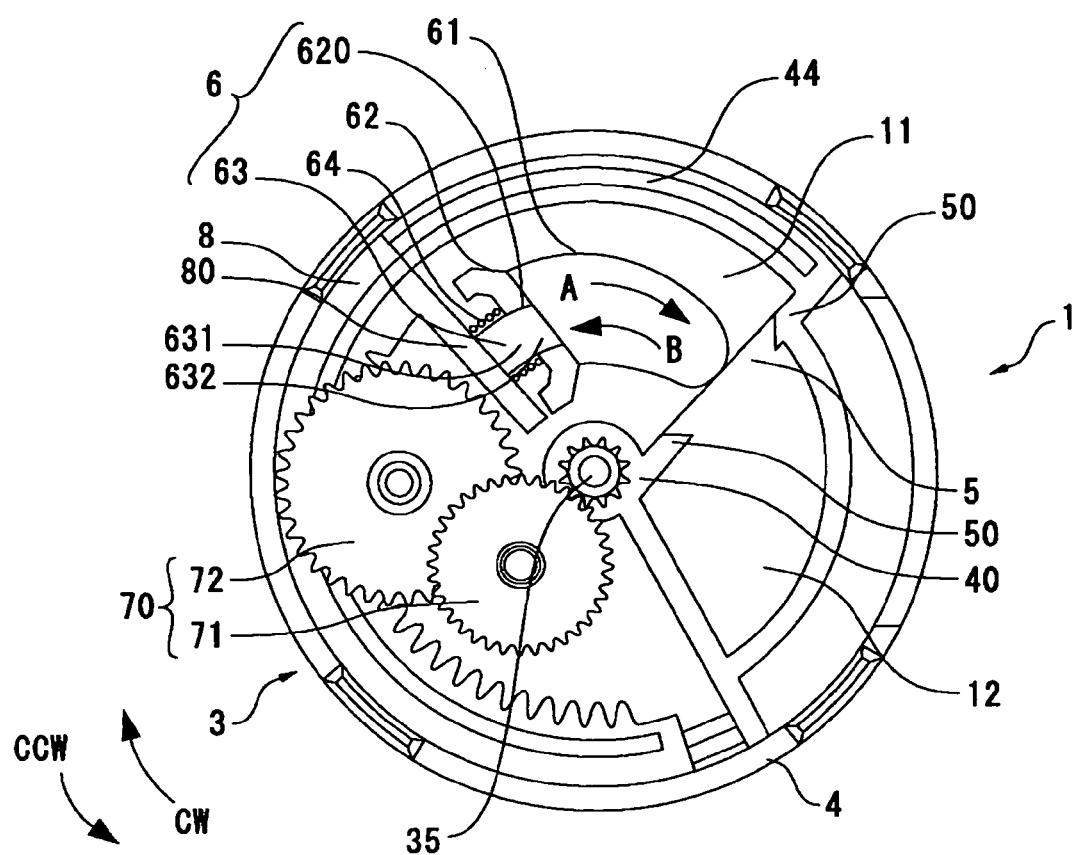

[Fig. 4]
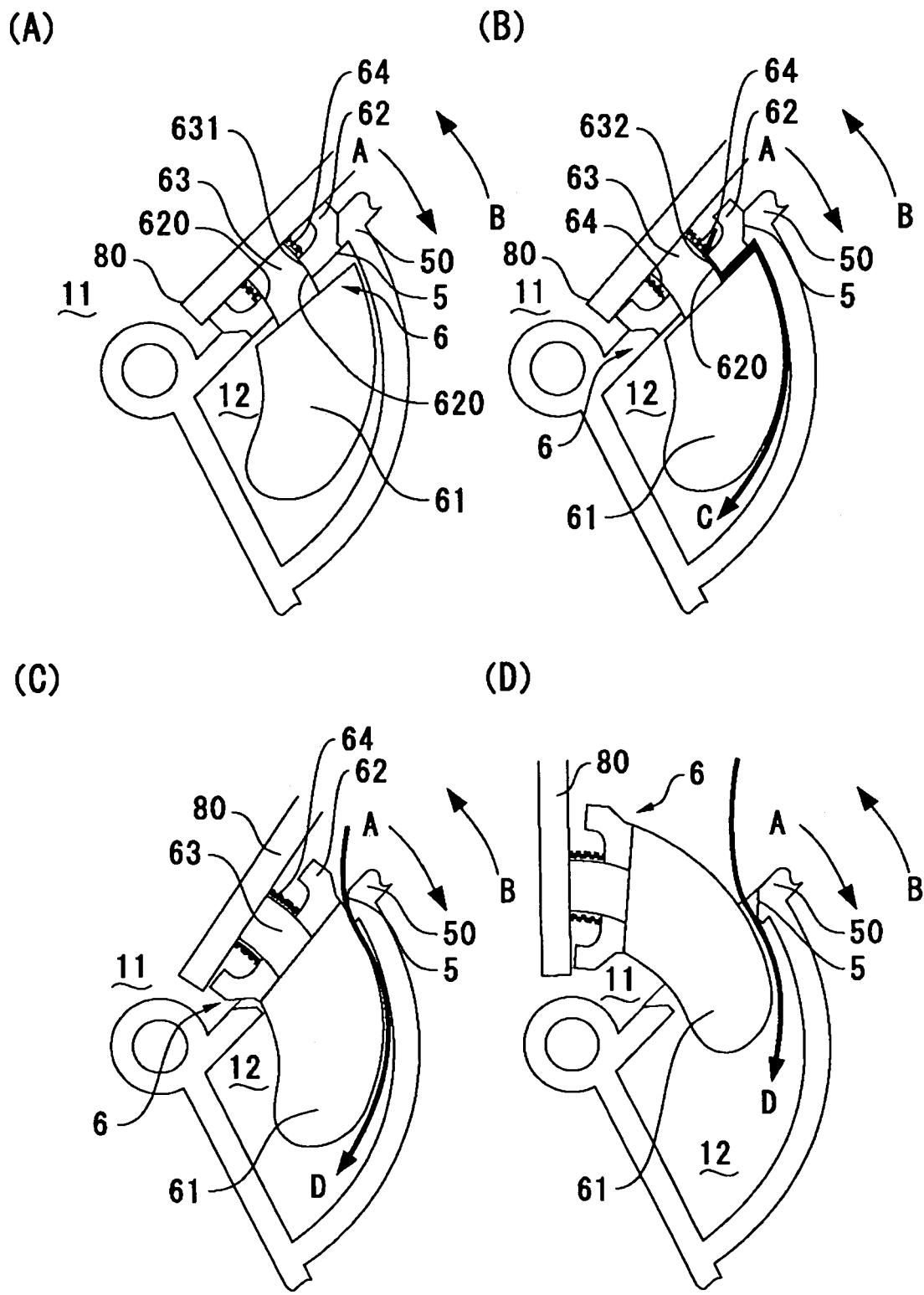

[Fig. 5]
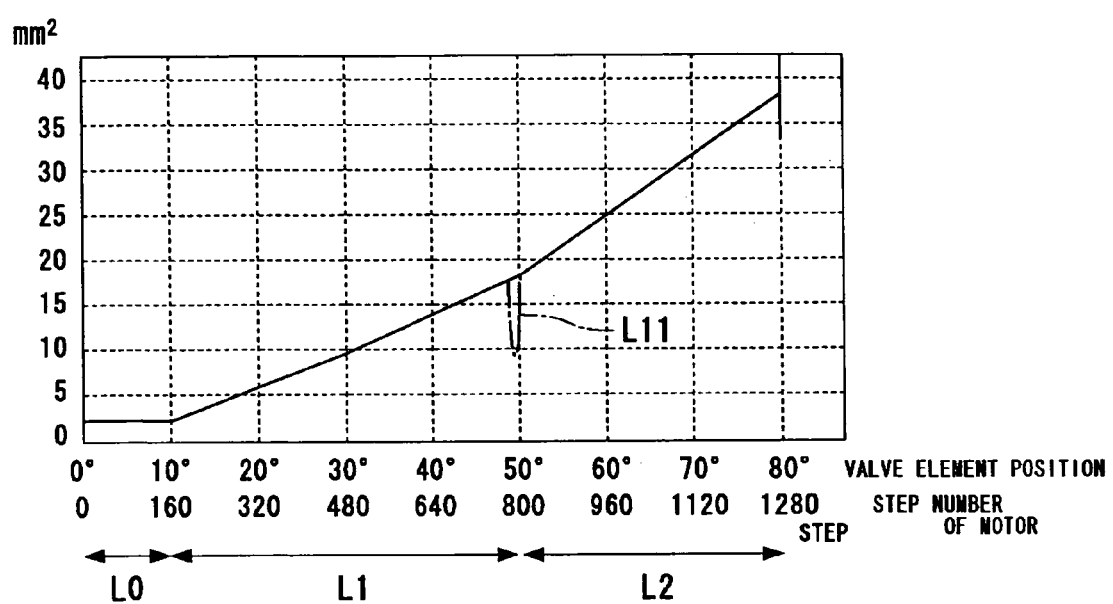

[Fig. 6]
(A)
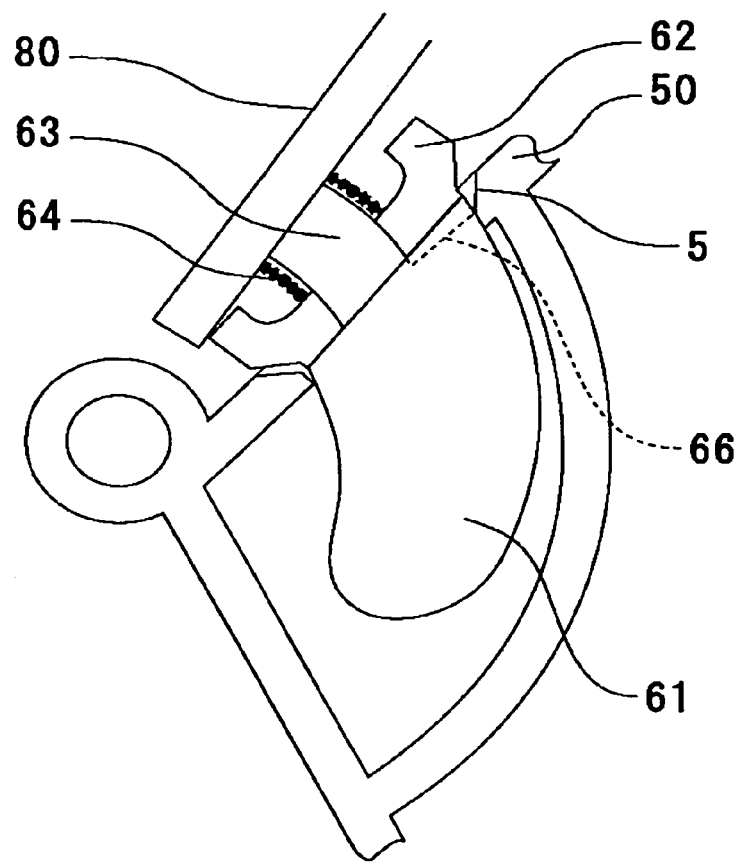
(B)
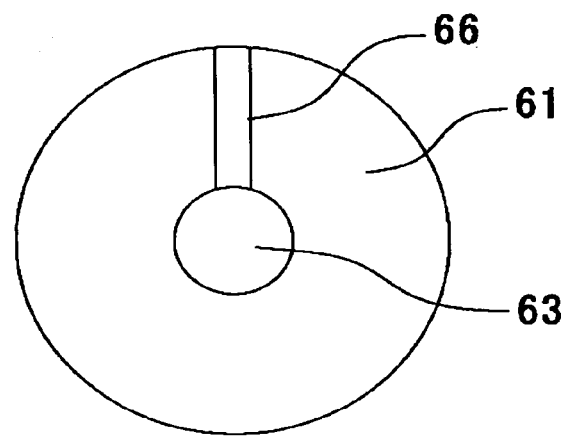

[Fig. 7]
(A)
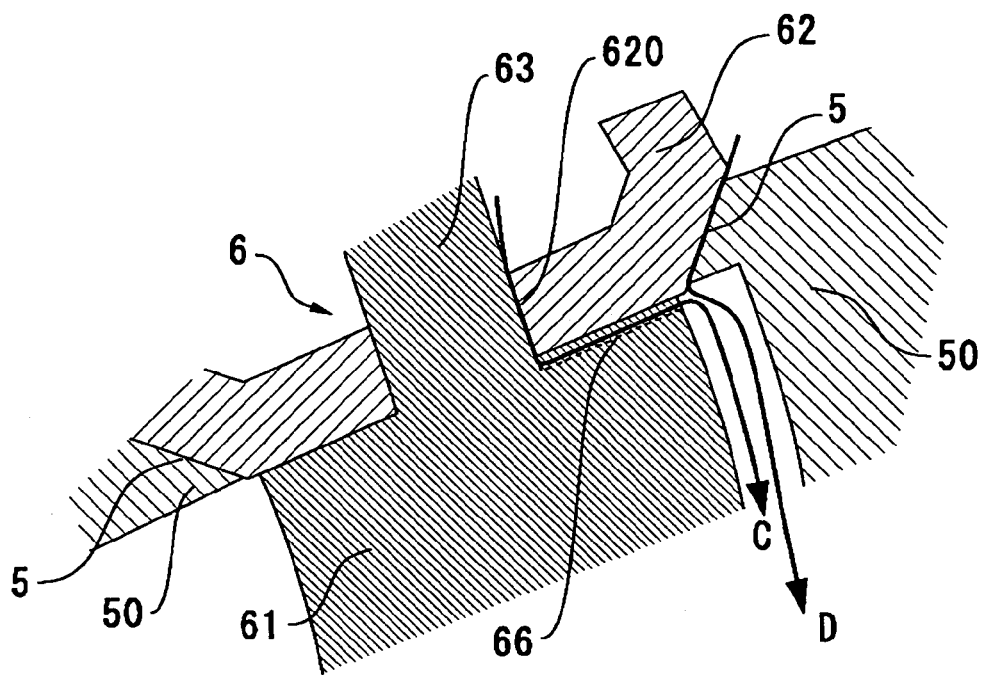
(B)
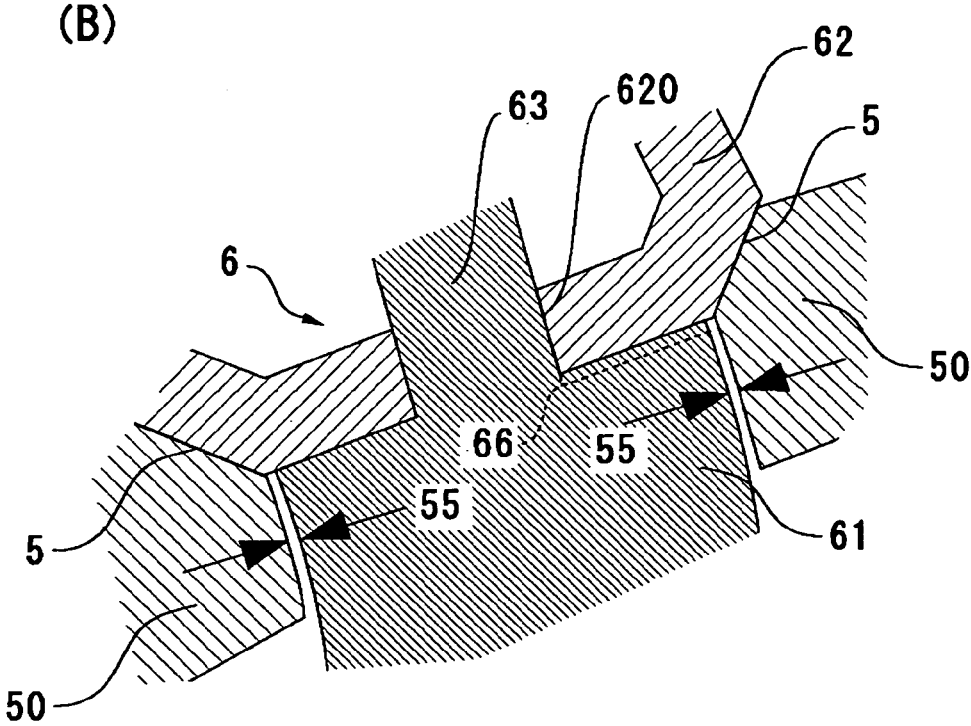

FLOW CONTROL DEVICE

BACKGROUND OF THE INVENTION

1. Field of the Invention

The present invention relates to a flow control device for controlling the rate of flow for various kinds of fluids. Specifically, the present invention relates to a valve mechanism of the flow control device.

2. Description of Related Art

In a valve mechanism which is used in a flow control device for controlling the rate of flow of liquefied petroleum (LP) gas, city gas, coolant for a refrigerator and an air-conditioner or liquid, a valve element is commonly driven by a solenoid.

However, a solenoid drive system controls the valve element to be in an opened state or a closed state by it being turned-on or turned-off. Therefore, when the flow rate is controlled with a high degree of precision, the operations of turning-on or turning-off are frequently repeated and thus an impact sound occurs. In addition, chattering which is inherent in a solenoid may occur and, if it occurs, a high degree of precision in controlling the flow rate is not attained.

SUMMARY OF THE INVENTION

In view of the problems described above, it is an advantage of the present invention to provide a flow control device which is capable of controlling the flow rate with a high degree of precision over a wide range without occurring the impact sound and chattering by adopting a new valve mechanism.

In order to achieve the above advantage, according to an embodiment of the present invention, there is provided a flow control device including an opening part through which an upstream side of a fluid flow passage is in communication with a downstream side of the fluid flow passage, a valve element for closing the opening part, and a valve drive device which rotates to drive the valve element in a closed direction for closing the opening part or in the opened direction for opening the opening part. The valve element includes a large flow rate controlling valve element capable of adjusting an opening degree of the opening part, a sealing member which is provided with a valve hole having an open area smaller than the opening part and is formed to be capable of being brought into tight contact with a peripheral wall part of the opening part, and a small flow rate controlling valve element capable of adjusting an opening degree of the valve hole of the sealing member.

According to the flow control device having such a constitution, the valve element for closing the opening part includes the large flow rate controlling valve element, the sealing member and the small flow rate controlling valve element. In a small flow rate region, the sealing member closes the opening part and the small flow rate controlling valve element adjusts the opening degree of the valve hole of the sealing member. In a large flow rate region, the sealing member is moved apart from the peripheral wall part of the opening part and the opening degree of the opening part is adjusted by the large flow rate controlling valve element. Therefore, in both the small flow rate region and the large flow rate region, the flow rate can be controlled with a high degree of precision.

In accordance with an embodiment of the present invention, the flow control device is constituted to provide a closed state in which the sealing member is brought into tight contact with the peripheral wall part to close the opening part and the valve hole of the sealing member is substantially closed by the small flow rate controlling valve element, a small flow rate state in which the opening degree of the valve hole of the sealing member is adjusted by the small flow rate controlling valve element while the sealing member is brought into tight contact with the peripheral wall part, and a large flow rate state in which the sealing member is moved apart from the peripheral wall part of the opening part such that the opening degree of the opening part is adjusted by the large flow rate controlling valve element.

In accordance with an embodiment of the present invention, the valve drive device includes a motor as a drive source and a transmission mechanism which transmits the output of the motor to the valve element for moving the valve element in the opened direction or the closed direction. According to the flow control device in which the motor is used as the drive source of the valve drive device to relatively move the valve element with respect to the opening part, the impact sound and chattering do not occur, which is different from the case in which the solenoid is used.

In accordance with an embodiment of the present invention, the small flow rate controlling valve element is a rod-shaped valve element which is formed so as to extend in the moving direction of the valve element and is fit within the valve hole of the sealing member so as to be movable within the valve hole. The front end portion of the rod-shaped valve element is fixed to the large flow rate controlling valve element whose diameter is larger than that of the valve hole, movable along with the large flow rate controlling valve element in an integral manner, and capable of adjusting a clearance area to an inner wall face of the valve hole according to a penetrating depth of the rod-shaped valve element into the valve hole. The sealing member is moved apart from the opening part in a large flow rate state.

According to the flow control device having such a constitution, the valve element is so constituted that the flow rate can be controlled with a high degree of precision in both the small flow rate region and the large flow rate region with a simple constitution and fewer mechanical parts.

In accordance with an embodiment of the present invention, the rod-shaped valve element has an outer diameter size which is capable of closing the valve hole of the sealing member and the rod-shaped valve element is formed in such a manner that a front end side part from a mid portion of the rod-shaped valve element is formed such that its diameter is set to be slightly thinner towards the end portion of the front end side part. According to the flow control device having such a constitution, the flow rate can be controlled with a high degree of precision in the small flow rate region with a simple constitution.

In accordance with an embodiment of the present invention, a spring member, e.g., a coil spring is disposed around the rod-shaped valve element for energizing the sealing member towards the peripheral wall part of the opening part. According to the flow control device having such a constitution, the sealing member can be surely brought into contact with the peripheral wall part of the opening part in both the substantially closed state and the small flow rate state.

In accordance with an embodiment of the present invention, a groove-shaped flow passage is preferably formed between the sealing member and the large flow rate controlling valve element when the large flow rate controlling valve element is abutted with the sealing member. In this case, it is preferable that the flow rate in the groove-shaped flow passage is set to be roughly equal to the flow rate when the opening degree of the opening part is minimized by the large flow rate controlling valve element.

According to the flow control device having such a constitution, even when the sealing member abuts against the large flow rate controlling valve element at the time the flow rate changes from the small flow rate state to the large flow rate state, the flow is not varied and restricted suddenly. In other words, the flow rate in the groove-shaped flow passage is roughly equal to the flow rate when the opening degree of the opening part is minimized by the large flow rate controlling valve element, and thus the sudden flow rate variation when the small flow rate region changes to the large flow rate region is prevented.

In accordance with an embodiment of the present invention, the front end portion of the large flow rate controlling valve element is formed such that the diameter of the front end portion is narrowed towards its front end side. The tapered front end portion of the large flow rate controlling valve element enters into an inner side of the opening part and is capable of adjusting the opening degree of the opening part. According to the flow control device having such a constitution, the flow rate can be controlled with a high degree of precision in the large flow rate region with a simple constitution.

In accordance with an embodiment of the present invention, the valve element is driven to trace an arc-shaped trajectory by the valve drive device and the opening part is formed opened in a peripheral direction so as to be inserted by the large flow rate controlling valve element. According to the flow control device having such a constitution, the rotation of the motor is transmitted to the valve element as a rotational motion and thus the transmission mechanism is simplified and energy loss becomes little in comparison with a valve drive device in which the valve element moves towards a straight direction.

In accordance with an embodiment of the present invention, both the large flow rate controlling valve element and the small flow rate controlling valve element are formed in a curved shape so as to form along the arc-shaped trajectory of the valve element. According to the flow control device having such a constitution, the large flow rate controlling valve element and the small flow rate controlling valve element are easily constituted so as not to interfere with another portion. Consequently, the stroke of the large flow rate controlling valve element and the small flow rate controlling valve element can be set longer and thus the flow rate can be adjusted with a high degree of precision.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIG. 1(A) is a plan view showing a flow control device in accordance with an embodiment of the present invention. FIG. 1(B) is a front view showing the flow control device. FIG. 1(C) is a bottom view showing the flow control device.

FIG. 2 is a developed side view showing a train of gears and the like which are disposed within a case of the flow control device.

FIG. 3 is a plan view showing a layout of mechanical components which are disposed within the case of the flow control device.

FIG. 4(A) is an explanatory plan view showing a closed state in the flow control device. FIG. 4(B) is an explanatory plan view showing a flowing state in a small flow rate region. FIG. 4(C) is an explanatory plan view showing a flowing state just after the small flow rate region is transferred into a large flow rate region. FIG. 4(D) is an explanatory plan view showing a flowing state in the large flow rate region.

FIG. 5 is a graph showing the relationship between the position of a valve element and the flow rate in the flow control device.

FIG. 6(A) is an explanatory plan view showing a flow control device in accordance with another embodiment of the present invention. FIG. 6(B) is an explanatory side view showing a large flow rate controlling valve element viewed from a small flow rate controlling valve element.

FIG. 7(A) is an explanatory sectional view of an essential portion showing a flow control device in a comparison example and FIG. 7(B) is an explanatory sectional view of an essential portion showing a flow control device in accordance with another embodiment of the present invention.

DETAILED DESCRIPTION OF THE PREFERRED EMBODIMENTS

A flow control device in accordance with an embodiment of the present invention will be described below in detail with reference to the accompanying drawings.

Entire Constitution

FIG. 1(A) is a plan view showing a flow control device in accordance with an embodiment of the present invention. FIG. 1(B) is a front view showing the flow control device and FIG. 1(C) is a bottom view showing the flow control device. FIG. 2 is a developed side view showing a train of gears and the like which are disposed within a case of the flow control device. FIG. 3 is a plan view showing a layout of mechanical components which are disposed within the case of the flow control device.

In FIGS. 1(A), 1(B) and 1(C) and FIG. 2, a flow control device 1 to which the present invention is applied is used to control the flow of liquefied petroleum (LP) gas, city gas, a coolant for a refrigerator or an air-conditioner, etc.

The flow control device 1 includes a housing 2 which is formed in an airtight manner by using a cup-shaped case 21, a lid member 22 and a seal member (not shown). A cylindrical part 24 within which a rotor 31 or the like of a stepping motor 30 is disposed is protruded upward from the lid member 22. A stator 33 of the stepping motor 30 is disposed on the outer peripheral face of the cylindrical part 24. A fluid inlet port 26 is opened at a side face part of the housing 2 and a fluid outlet port 27 is opened at a bottom part of the housing 2.

As shown in FIGS. 2 and 3, the inside of the housing 2 is divided by a partition wall part 40 formed as a part of a plate 4 into an upstream side 11, on which the fluid inlet port 26 is located, and a downstream side 12 on which a cylindrical fluid outlet port 27 is located. An opening part 5 connecting the upstream side 11 to the downstream side 12 is formed in the partition wall part 40. In the opening part 5, the inlet port located on the upstream side 11 is formed so as to open in a horizontal direction (peripheral direction). In addition, a peripheral wall part 50 around the opening part 5 is chamfered.

A valve element 6 described in detail below is disposed on the upstream side 11 of the opening part 5. In FIG. 3, a direction shown by the arrow A is a closed direction and a direction shown by the arrow B is an opened direction.

In FIGS. 2 and 3, a valve drive device 3 for driving the valve element 6 in the direction shown by the arrow A or the arrow B is provided with a stepping motor 30 capable of rotating in the forward/backward directions and a transmission mechanism 70 including a train of gears. The transmission mechanism 70 is disposed within the cup-shaped case 21.

In the valve drive device 3, the output shaft 35 of the stepping motor 30 is rotatably supported by a receiving portion of the plate 4. At a side position of the output shaft 35 is disposed the transmission mechanism 70 including a first gear wheel 71 having outer teeth which are engaged with a pinion fixed on the output shaft 35 and a second gear wheel 72 disposed at a side position of the first gear wheel 71 and having outer teeth which are engaged with a pinion fixed on the rotary shaft of the first gear wheel 71.

A guide groove 44 is formed in a peripheral direction on the bottom part of the plate 4 along its inner peripheral wall and a movable body 8 is disposed on the guide groove 44. The movable body 8 is provided with inner teeth on its inner peripheral side face which engage with the pinion fixed on the rotary shaft of the second gear wheel 72. The valve element 6 is fixed on the end part 80 of the movable body 8. Therefore, the valve element 6 is driven in the direction perpendicular to the output shaft 35 of the stepping motor 30 as shown by the arrow A or the arrow B and moves on an arc-shaped trajectory around the output shaft 35 of the stepping motor 30.

Constitution of Valve Element

The valve element 6 is provided with a large flow rate controlling valve element 61 capable of adjusting the opening degree of the opening part 5, a ring-shaped sealing member 62 which is formed so as to be capable of being in tight contact with the peripheral wall part 50 of the opening part 5 and has a valve hole 620 formed so as to have an aperture area smaller than the opening part 5, and a small flow rate controlling valve element 63 capable of adjusting the opening degree of the valve hole 620 of the sealing member 62. The aperture edge of the valve hole 620 is chamfered.

The small flow rate controlling valve element 63 is a rod-shaped valve element which is formed so as to extend in the moving direction of the valve element 6 and is loosely fit within the valve hole 620 so as to movable within the valve hole 620. The large flow rate controlling valve element 61 is fixed to the front end portion of the small flow rate controlling valve element 63. Therefore, the small flow rate controlling valve element 63 is movable along with the large flow rate controlling valve element 61 in an integral manner. The small flow rate controlling valve element 63 is formed in a curved shape so as to correspond to the arc-shaped trajectory of the valve element 6.

In the valve element 6, a coil spring 64 is disposed around the small flow rate controlling valve element 63, which gives an energizing force in the direction such that the sealing member 62 is separated from the end part 80 of the movable body 8. That is, the coil spring 64 energizes the sealing member 62 towards the large flow rate controlling valve element 61.

The small flow rate controlling valve element 63 is formed in such a manner that a mid portion 631 formed on the end part 80 of the movable body 8 in a longitudinal direction of the small flow rate controlling valve element 63 has an outer diameter size which is capable of substantially closing the valve hole 620 of the sealing member 62. The front end side part 632 on the mid portion 631 is formed such that the diameter is set to be slightly thinner towards the end portion of the front end side part 632. Therefore, the small flow rate controlling valve element 63 is capable of adjusting the clearance area or the gap space in the inner wall face of the valve hole 620 in accordance with the penetrating depth or the position of the small flow rate controlling valve element 63 into the valve hole 620. In the embodiment of the present invention, for example, the inner diameter of the valve hole 620 is 3.0 mm and the diameter of the mid portion 631 of the small flow rate controlling valve element 63 is 2.9 mm. Therefore, the cross sectional area of the valve hole 620 at the minimum clearance state (substantially closed state) is 0.46 mm$^2$.

The large flow rate controlling valve element 61 is formed so as to have a larger diameter than the valve hole 620. Therefore, in the closed state (substantially closed state) shown in FIG. 4(A), even when the small flow rate controlling valve element 63 slightly moves in an opened direction or the direction "B" along with the movable body 8, the sealing member 62 is pressed by the fluid pressure and the coil spring 64, such that the sealing member 62 is maintained to be brought into tight contact with the peripheral wall part 50 of the opening part 5 and thus maintains the closed state of the opening part 5. When the small flow rate controlling valve element 63 further moves in the opened direction along with the movable body 8, the sealing member 62 abuts with the large flow rate controlling valve element 61 and moves in the opened direction along with the small flow rate controlling valve element 63 and the large flow rate controlling valve element 61 and becomes apart from the peripheral wall part 50.

The front end portion of the large flow rate controlling valve element 61 is formed thinner such that its diameter is decreased towards the front end side, that is, towards the opening part 5. Therefore, the tapered front end portion enters into the inner side of the opening part 5 and is capable of adjusting the opening degree of the opening part 5. The large flow rate controlling valve element 61 is formed so as to correspond to the arc-shaped trajectory of the valve element 6. In the embodiment of the present invention, for example, the minimum diameter of the opening part 5 is 8.0 mm and the maximum diameter of the large flow rate controlling valve element 61 is 7.9 mm. Therefore, the cross sectional area (opening degree) of the opening part 5 at the minimum clearance state is 1.25 mm$^2$.

Operation

FIG. 4(A) is an explanatory view showing a closed state (substantially closed state) in the flow control device to which the present invention is applied. FIG. 4(B) is an explanatory view showing a flowing state in a small flow rate state. FIG. 4(C) is an explanatory view showing a flowing state just after the small flow rate state is transferred into a large flow rate state. FIG. 4(D) is an explanatory view showing a flowing state in the large flow rate state. FIG. 5 is a graph showing the relationship between the position of the valve element and the flow rate in the flow control device in accordance with the embodiment of the present invention.

In the flow control device 1 in accordance with the embodiment of the present invention, the movable body 8 and the valve element 6 are located at the utmost closed position in the closed state shown in FIG. 4(A). In this state, the sealing member 62 is pressed by the fluid pressure and the coil spring 64 and kept being brought into contact with the peripheral wall part 50 of the opening part 5 and the closed state of the opening part 5 is maintained. In this state, the mid portion 631 of the small flow rate controlling valve element 63 is located in the valve hole 620 and the diameter of the mid portion 631 is set to be approximately equal to the diameter of the valve hole 620. Therefore, this position is the substantially closed state that the clearance area between the small flow rate controlling valve element 63 and the valve hole 620 is the smallest. Such a closed state is shown by the closed region "L0" in FIG. 5. The embodiment described above is preferably applied to the flow control device for gas and is constituted in such a manner that gas flows slightly even in the closed state. However, the diameter of the mid portion 631 may be set equal to the diameter of the valve hole 620 to make the state become completely closed and the flow rate to be zero.

When the output shaft 35 of the stepping motor 30 rotates in the counterclockwise direction CCW from the closed state shown in FIG. 4(A), the first gear wheel 71 rotates in the clockwise direction CW and the second gear wheel 72 rotates in counterclockwise direction CCW. As a result, the movable body 8 also rotates in the counterclockwise direction CCW and the valve element 6 is driven in the opened direction as shown by the arrow "B" (see FIG. 4(B)). As a result, the small flow rate controlling valve element 63 and the large flow rate controlling valve element 61 begin to move in the opened direction as shown by the arrow "B". However, when the small flow rate controlling valve element 63 and the large flow rate controlling valve element 61 slightly move in an opened direction or the direction "B", the sealing member 62 is pressed by the fluid pressure and the energizing force of the coil spring 64 so as to be kept being brought into contact with the peripheral wall part 50 of the opening part 5 and thus the closed state of the opening part 5 is maintained.

When the small flow rate controlling valve element 63 moves in the valve hole 620, the portion located in the valve hole 620 moves to the front end side part 632 of the small flow rate controlling valve element 63. The front end side part 632 is formed thinner such that its diameter is set to be slightly decreased towards the front end side. Therefore, the fluid flows from the upstream side to the downstream side as shown by the arrow "C" with the flow rate in the small flow rate state which corresponds to the clearance area between the small flow rate controlling valve element 63 and the inner wall face of the valve hole 620. The small flow rate state described above is shown by the small flow rate region "L1" in FIG. 5.

When the output shaft 35 of the stepping motor 30 further rotates in the counterclockwise direction CCW from the state shown in FIG. 4(B), the first gear wheel 71 further rotates in the clockwise direction CW and the second gear wheel 72 further rotates in the counterclockwise direction CCW. As a result, the movable body 8 also further rotates in the counterclockwise direction CCW and the valve element 6 is further driven in the opened direction as shown by the arrow "B" (see FIG. 4(C)). As a result, the small flow rate controlling valve element 63 and the large flow rate controlling valve element 61 further move in the opened direction as shown by the arrow "B". In this case, after the sealing member 62 abuts against the large flow rate controlling valve element 61, the sealing member 62 is further driven in the opened direction by the large flow rate controlling valve element 61 as shown by the arrow "B" and apart from the peripheral wall part 50. Therefore, the fluid flows from the upstream side 11 to the downstream side 12 through the opening part 5 as shown by the arrow D with the flow rate in the large flow rate state in which the opening degree of the opening part 5 is adjusted by the large flow rate controlling valve element 61.

When the output shaft 35 of the stepping motor 30 further rotates in the counterclockwise direction CCW from this state, the valve element 6 is further driven in the opened direction as shown by the arrow "B" (see FIG. 4(D)). As a result, the small flow rate controlling valve element 63 and the large flow rate controlling valve element 61 is further driven in the opened direction as shown by the arrow "B", the fluid flows from the upstream side 11 to the downstream side 12 through the opening part 5 as shown by the arrow D with the flow rate in the large flow rate state which corresponds to the enlarged opening degree of the opening part 5 with the large flow rate controlling valve element 61. This large flow rate state is shown by the large flow rate region "L2" in FIG. 5.

On the other hand, when the output shaft 35 of the stepping motor 30 rotates in the clockwise direction CW from the opened state as shown in FIG. 4(D), the first gear wheel 71 rotates in the counterclockwise direction CCW and the second gear wheel 72 rotates in the clockwise direction CW As a result, the movable body 8 rotates in the clockwise direction CW and the valve element 6 is driven in the closed direction as shown by the arrow "A" and operations are performed in sequential order so as to be reversed to the above-mentioned opening mode. In this case, the valve drive device 3 is driven in the direction such that the coil spring 64 is further more compressed than in the closed state in which the sealing member 62 is first brought into contact with the peripheral wall part 50 of the opening part 5 and driven furthermore to the closed state shown in FIG. 4(A) which is set to be the home position of the closed state.

As described above, in the embodiment of the present invention, a motor is used as the drive source of the valve drive device 3 for moving the valve element 6 with respect to the opening part 5. Therefore, the impact sound and chattering do not occur, which is different from the case in which the solenoid is used to be turned on and off.

Also, the valve element 6 includes the large flow rate controlling valve element 61, the ring-shaped sealing member 62 having the valve hole 620, and the small flow rate controlling valve element 63. In the small flow rate region, the opening degree of the valve hole 620 is adjusted by the small flow rate controlling valve element 63 as the valve element 6 is moved while the sealing member 62 is in tight contact with the peripheral wall part 50 so as to keep the opening part 5 closed. On the other hand, in the large flow rate region, the sealing member 62 is apart from the peripheral wall part 50 as the valve element 6 is moved and the opening degree of the opening part 5 is adjusted by the large flow rate controlling valve element 61. Consequently, the flow rate can be controlled with a high degree of precision in both the small flow rate region and the large flow rate region.

Moreover, the opening degree of the opening part 5 is adjusted by the tapered front end portion of the large flow rate controlling valve element 61 entering into the inner side of the opening part 5. Therefore, the large flow rate can be controlled with a high degree of precision in a simple constitution.

In addition, the mid portion 631 in the longitudinal direction of the small flow rate controlling valve element 63 has the outer diameter size which can substantially close the valve hole 620 and the front end side part 632 from the mid portion 631 formed thinner so as to be in the tapered shape. Therefore, the flow rate in the small flow rate region can be controlled with a high degree of precision in a simple constitution.

In addition, since the rotation of the output shaft 35 of the motor is transmitted to the valve element 6 as a rotational motion, the transmission mechanism 70 can be simplified and energy loss becomes little in comparison with a valve drive device in which the valve element 6 moves in a straight direction.

Further, both the large flow rate controlling valve element 61 and the small flow rate controlling valve element 63 are formed in the curved shape so as to be along the arc-shaped trajectory of the valve element 6. Therefore, the large flow rate controlling valve element 61 and the small flow rate controlling valve element 63 do not interfere with other portions. Consequently, the stroke of the large flow rate controlling valve element 61 and the small flow rate controlling valve element 63 can be set longer and thus the flow rate can be adjusted with a high degree of precision.

Moreover, the transmission mechanism 70 is disposed on the opposite side with respect to the valve element 6 located at the closed position viewed from the rotation center axis for driving the valve element 6. Therefore, both the area disposing the valve element 6 and the opening part 5 and the area disposing the transmission mechanism 70 can be made wider. Consequently, the respective mechanical components can be easily disposed.

Other Embodiments

FIG. 6(A) is an explanatory view showing a flow control device in accordance with another embodiment of the present invention. FIG. 6(B) is an explanatory side view showing a large flow rate controlling valve element viewed from a small flow rate controlling valve element. In the embodiment shown in FIGS. 6(A) and 6(B), a groove 66 is formed on a surface of the large flow rate controlling valve element 61, whose face opposes the face of the sealing member 62.

The groove 66 is preferably used to ensure a groove-shaped flow passage which serves to secure the flow rate between the sealing member 62 and the large flow rate controlling valve element 61 in the state that the large flow rate controlling valve element 61 abuts the sealing member 62. The flow rate in the groove 66 is set to be equal to the flow rate when the opening degree of the opening part 5 is minimized by the large flow rate controlling valve element 61.

This is because that, when the flow rate changes from the small flow rate state to the large flow rate state, the sealing member 62 abuts against the large flow rate controlling valve element 61 and thus the flow in the small flow rate state may be prevented suddenly before the large flow rate state begins. In this case, the sudden variation in the flow rate may occur as shown by the alternate long and short dash line L11 in FIG. 5. However, in the embodiment described above, since the groove-shaped flow passage by the groove 66 is provided, the sudden flow rate variation when the small flow rate region is transferred to the large flow rate region is prevented. Alternatively, the groove-shaped flow passage may be formed on the face of the sealing member 62 opposite the large flow rate controlling valve element 61.

In addition, in the case that the groove-shaped flow passage (groove 66) is formed, when the small flow rate region is transferred into the large flow rate region, a sudden increase of flow rate may occur. This is because the flow rate (flow shown by arrow "C" in FIG. 7(A)) in the small flow rate state is added with the flow rate (flow shown by arrow "D" in FIG. 7(A)) which is just after the mode transferred into the large flow rate region. In this case as shown in FIG. 7(A), there is a large space between the peripheral wall part and the large flow rate controlling valve element 61. To prevent such a sudden increase in the flow rate, as shown in FIG. 7(B), a gap part 55 for the aperture diaphragm is formed between the peripheral wall part 50 and the large flow rate controlling valve element 61 for reducing the flow rate when the flow rate changes between the small flow rate state and the large flow rate state. The flow rate can be preferably limited by setting the space of the gap part 55 for the aperture diaphragm when the flow rate changes between the small flow rate region and the large flow rate region.

In the embodiment described above, the valve element 6 is driven so as to rotate, but it may be constituted so as to move in a linear manner, for example, such that a screw-shaped valve element 6 moves through a screw groove portion while being rotated. Moreover, in the embodiment described above, a stepping motor 30 is used as a drive source. However, a DC motor and an AC motor may be used. When such a motor is used, time control or time control utilizing positional recognition is performed instead of the step control.

In addition, the fluid which is the object to be controlled of the flow rate may be not only gas but also liquid.

As described above, in the flow control device according to the present invention, a motor is used as the drive source of the valve drive device for relatively moving the valve element with respect to the opening part. Therefore, the impact sound and chattering do not occur, which is different from the case in which the solenoid is used.

In addition, the valve element includes the large flow rate controlling valve element, the ring-shaped sealing member having the valve hole, and the small flow rate controlling valve element. In the small flow rate region, the opening degree of the valve hole is adjusted by the small flow rate controlling valve element as the valve element moves while the sealing member is in tight contact with the peripheral wall part to keep the opening part closed. On the other hand, in the large flow rate region, the sealing member is apart from the peripheral wall part as the valve element moves and the opening degree of the opening part is adjusted by the large flow rate controlling valve element. Consequently, the flow rate can be controlled with a high degree of precision in both the small flow rate region and the large flow rate region.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A flow control device comprising:
   an opening part through which an upstream side of a fluid flow passage is in communication with a downstream side of the fluid flow passage;
   a valve element for closing the opening part, the valve element comprising:
   a large flow rate controlling valve element capable of adjusting an opening degree of the opening part;
   a sealing member provided with a valve hole having an open area smaller than the opening part and formed to be capable of being brought into tight contact with a peripheral wall part of the opening part; and a small flow rate controlling valve element capable of adjusting an opening degree of the valve hole; and a valve drive device which rotates to drive the valve element in a closed direction for closing the opening part or in an opened direction for opening the opening part, wherein the small flow rate controlling valve element is a rod-shaped valve element formed so as to extend in a driving direction of the valve element, wherein a front end portion of the rod-shaped valve element in the driving direction of the valve element is fixed to the large flow rate controlling valve element with a diameter larger than that of the valve hole of the sealing member, wherein the sealing member is mounted to the rod-shaped valve element so as to be capable of forming a small flow rate state through a space between an outer face of the rod-shaped valve element and an inner face of the valve hole of the sealing member and a subsequent space between the sealing member and the large flow rate controlling valve element, and wherein the space between the outer face of the rod-shaped valve element and the inner face of the valve hole of the sealing member is closed according to a further movement of the rod-shaped valve element in the driving direction of the valve element.

2. The flow control device according to claim 1, wherein the rod-shaped valve element is fit within the valve hole so as to be movable within the valve hole, is movable along with the large flow rate controlling valve element in an integral manner, and is capable of adjusting a clearance area to the inner face of the valve hole of the sealing member according to a penetrating depth of the rod-shaped valve element into the valve hole of the sealing member, and the sealing member moves apart from the opening part in a large flow rate state.

3. The flow control device according to claim 2, wherein the rod-shaped valve element is formed in such a manner that a mid portion of the rod-shaped valve element has an outer diameter capable of substantially closing the valve hole of the sealing member and a front end side part from the mid portion is formed thinner such that a diameter is slightly decreased towards an end portion of the front end side part of the rod-shaped valve element.

4. The flow control device according to claim 2, further comprising a spring member disposed around the rod-shaped valve element for energizing the sealing member towards the peripheral wall part of the opening part.

5. The flow control device according to claim 2, further comprising a groove-shaped flow passage formed between the sealing member and the large flow rate controlling valve element in a state that the large flow rate controlling valve element abuts the sealing member, wherein a flow rate in the groove-shaped flow passage is roughly equal to a flow rate when the opening degree of the opening part is minimized by the large flow rate controlling valve element.

6. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole;

a valve drive device which rotates to drive the valve element in a closed direction for closing the opening part or in an opened direction for opening the opening part; and a motor as a driving source and a transmission mechanism which transmits an output of the motor to the valve element for moving the valve element in the opened direction or the closed direction, wherein the sealing member comprises:

a closed state in which the sealing member is in tight contact with the peripheral wall part of the opening part to close the opening part and the valve hole of the sealing member is substantially closed by the small flow rate controlling valve element;

a small flow rate state in which an opening degree of the valve hole of the sealing member is adjusted by the small flow rate controlling valve element while the sealing member is in tight contact with the peripheral wall part of the opening part; and a large flow rate state in which the sealing member is moved apart from the peripheral wall part of the opening part by the large flow rate controlling valve element such that the opening degree of the opening part is adjusted by the large flow rate controlling valve element.

7. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole; and a valve drive device which rotates to drive the valve element in a closed direction for closing the opening part or in an opened direction for opening the opening part, wherein a front end portion of the large flow rate controlling valve element is formed narrowly tapered such that a diameter of the front end portion of the large flow rate controlling valve element decreases towards a front end side, and wherein the tapered front end portion of the large flow rate controlling valve element enters into an inner side of the opening part and is capable of adjusting the opening degree of the opening part.

8. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole; and a valve drive device which rotates to drive the valve element in a closed direction for closing the opening part or in an opened direction for opening the opening part, wherein the valve element is driven by the valve drive device so as to follow an arc-shaped trajectory and the opening art is formed opened in a peripheral direction so as to be inserted by the large flow rate controlling valve element.

9. The flow control device according to claim 8, wherein both the large flow rate controlling valve element and the small flow rate controlling valve element are formed a curved shape so as to be along the arc-shaped trajectory of the valve element.

10. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole; and means for rotating to drive the valve element in a closed direction for closing the opening part or in an opened direction for opening the opening part, wherein the small flow rate controlling valve element is a rod-shaped valve element formed so as to extend in a driving direction of the valve element, wherein a front end portion of the rod-shaped valve element in the driving direction of the valve element is fixed to the large flow rate controlling valve element with a diameter larger than that of the valve hole of the sealing member, wherein the sealing member is mounted to the rod-shaped valve element so as to be capable of forming a small flow rate state through a space between an outer face of the rod-shaped valve element and an inner face of the valve hole of the sealing member and a subsequent space between the sealing member and the large flow rate controlling valve element, and wherein the space between the outer face of the rod-shaped valve element and the inner face of the valve hole of the sealing member is closed according to a further movement of the rod-shaped valve element in the driving direction of the valve element.

11. The flow control device according to claim 10, wherein the rod-shaped valve element formed is fit within the valve hole so as to be movable within the valve hole, is movable along with the large flow rate controlling valve element in an integral manner, and is capable of adjusting a clearance area to the inner face of the valve hole of the sealing member according to a penetrating depth of the rod-shaped valve element into the valve hole of the sealing member, and the sealing member moves apart from the opening part in a large flow rate state.

12. The flow control device according to claim 11, wherein the rod-shaped valve element is formed in such a manner that a mid portion of the rod-shaped valve element has an outer diameter capable of substantially closing the valve hole of the sealing member and a front end side part from the mid portion is formed thinner such that a diameter is slightly decreased towards an end portion of the front end side part of the rod shaped valve element.

13. The flow control device according to claim 11, further comprising a spring member disposed around the rod-shaped valve element for energizing the sealing member towards the peripheral wall part of the opening part.

14. The flow control device according to claim 11, further comprising a groove-shaped flow passage formed between the sealing member and the large flow rate controlling valve element in a state that the large flow rate controlling valve element abuts the sealing member, wherein a flow rate in the groove-shaped flow passage is roughly equal to a flow rate when the opening degree of the opening part is minimized by the large flow rate controlling valve element.

15. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole;

means for rotating to drive the valve element in a closed direction for closing the opening part or in an opened direction for opening the opening part; and a motor as a driving source and a transmission mechanism which transmits an output of the motor to the valve element for moving the valve element in the opened direction or the closed direction, wherein the sealing member comprises:

a closed state in which the sealing member is in tight contact with the peripheral wall part of the opening part to close the opening part and the valve hole of the sealing member is substantially closed by the small flow rate controlling valve element;

a small flow rate state in which an opening degree of the valve hole of the sealing member is adjusted by the small flow rate controlling valve element while the sealing member is in tight contact with the peripheral wall part of the opening part; and a large flow rate state in which the sealing member is moved apart from the peripheral wall part of the opening part by the large flow rate controlling valve element such that the opening degree of the opening part is adjusted by the large flow rate controlling valve element.

16. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole; and means for rotating to drive the valve element in a closed direction for closing the opening part or in an opened direction for opening the opening part, wherein a front end portion of the large flow rate controlling valve element is formed narrowly tapered such that a diameter of the front end portion of the large flow rate controlling valve element decreases towards a front end side, and wherein the tapered front end portion of the large flow rate controlling valve element enters into an inner side of the opening part and is capable of adjusting the opening degree of the opening part.

17. A flow control device comprising:

an opening part through which an upstream side of a fluid flow passage is in communication with a downstream side of the fluid flow passage;

a valve element for closing the opening part, the valve element comprising:

a large flow rate controlling valve element capable of adjusting an opening degree of the opening part;

a sealing member provided with a valve hole having an open area smaller than the opening part and formed to be capable of being brought into tight contact with a peripheral wall part of the opening part; and a small flow rate controlling valve element capable of adjusting an opening degree of the valve hole; and means for rotating to drive the valve element in a closed direction for closing the opening part or in an opened direction for opening the opening part, wherein the valve element is driven by means for rotating to drive so as to follow an arc-shaped trajectory and the opening part is formed opened in a peripheral direction so as to be inserted by the large flown rate controlling valve element.

* * * * *